United States Patent
Griepenstroh

(10) Patent No.: US 12,525,744 B2
(45) Date of Patent: Jan. 13, 2026

(54) HIGH-CURRENT PLUG-IN CONNECTOR, PATCH CABLE AND PLUG-IN CONNECTOR SYSTEM FOR A RECHARGEABLE BATTERY PACK

(71) Applicant: HARTING Electric Stiftung & Co. KG, Espelkamp (DE)

(72) Inventor: Sebastian Griepenstroh, Lübbecke (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 304 days.

(21) Appl. No.: 18/038,034

(22) PCT Filed: Dec. 6, 2021

(86) PCT No.: PCT/DE2021/100973
§ 371 (c)(1),
(2) Date: May 22, 2023

(87) PCT Pub. No.: WO2022/122079
PCT Pub. Date: Jun. 16, 2022

(65) Prior Publication Data
US 2024/0006819 A1    Jan. 4, 2024

(30) Foreign Application Priority Data

Dec. 10, 2020   (DE) .................... 10 2020 132 965.2

(51) Int. Cl.
*H01R 13/64* (2006.01)
*H01M 50/503* (2021.01)
(Continued)

(52) U.S. Cl.
CPC .......... *H01R 13/64* (2013.01); *H01M 50/503* (2021.01); *H01R 13/11* (2013.01); *H01R 13/62933* (2013.01)

(58) Field of Classification Search
CPC .. H01R 13/64; H01R 13/11; H01R 13/62933; H01R 13/642; H01M 50/503
(Continued)

(56) References Cited

U.S. PATENT DOCUMENTS 11,424,577 B2 * 8/2022 Kliever ............. H01R 13/6315
2018/0358789 A1   12/2018 Corbo et al.

FOREIGN PATENT DOCUMENTS

CN       202308438 U    7/2012
CN       107809022 A    3/2018
(Continued)

*Primary Examiner* — Tulsidas C Patel
*Assistant Examiner* — Jeffrey Mountain
(74) *Attorney, Agent, or Firm* — Smartpat PLC

(57) ABSTRACT

A high-current plug-in connector (1, 1'), comprising a plug-in connector housing (13) and a socket contact (12, 12') which is arranged therein and has a plug-in region (121, 121') with a contact hole (120, 120'), wherein the high-current plug-in connector (1) has a coding for identifying its maximum current-carrying capacity, wherein the socket contact (12) has, at the contact hole (120), one or more grooves (1200), each with a contact spring (122) arranged therein or at least engaging therein, wherein the number of contact springs (122) determines the current-carrying capacity of the high-current plug-in connector (1), and the coding is formed by the depth of the contact hole (120).

7 Claims, 2 Drawing Sheets

(51) Int. Cl.
*H01R 13/11* (2006.01)
*H01R 13/629* (2006.01)

(58) Field of Classification Search
USPC .......................................................... 439/345
See application file for complete search history.

(56) References Cited

FOREIGN PATENT DOCUMENTS

| | | | |
|---|---|---|---|
| CN | 111430967 | A | 7/2020 |
| DE | 19624662 | A1 | 1/1997 |
| DE | 19718448 | A1 | 11/1998 |
| DE | 102011089978 | A1 | 6/2013 |
| DE | 102015105482 | A1 | 10/2016 |
| DE | 102016124501 | A1 | 6/2018 |
| EP | 2176901 | A2 | 1/2009 |

* cited by examiner

HIGH-CURRENT PLUG-IN CONNECTOR, PATCH CABLE AND PLUG-IN CONNECTOR SYSTEM FOR A RECHARGEABLE BATTERY PACK

CROSS-REFERENCE TO RELATED APPLICATION

This application is a national stage application, filed under 35 U.S.C. § 371, of International Patent Application No. PCT/DE2021/100973, filed on 6 Dec. 2021, which claims the benefit of German Patent Application No. 10 2020 132 965.2, filed 10 Dec. 2020.

BACKGROUND

The disclosure relates to a high-current plug-in connector for a rechargeable battery pack. A "rechargeable battery pack" is understood to be a pack of rechargeable batteries which are usually arranged in a rack, shelf and/or switch cabinet.

Furthermore, the disclosure relates to a patch cable comprising a high-current cable and two high-current plug-in connectors that are connected on the cable connection side in an electrically conductive manner thereto (in other words "attached" thereto).

Furthermore, the disclosure relates to a plug-in connector system comprising two high-current plug-in connectors and at least one mating plug-in connector.

Such high-current plug-in connectors and patch cables are required in order to connect multiple rechargeable batteries ("accumulators") to one another in series and/or parallel connection to form a configurable pack ("rechargeable battery pack").

In the prior art, battery columns, rechargeable battery cabinets and rechargeable battery racks are known in which multiple rechargeable batteries are connected to one another in parallel and/or in series by means of multiple patch cables in order to adapt their current strength and output voltage to the respective requirements.

The publications DE 10 2015 105 482 B4 and US 2018/0358789 A1 describe the basic structure of such a switch cabinet or rack.

The publication EP 2 176 901 B1 shows a rechargeable battery for hand-held electromechanical tools, having a plurality of rechargeable cells which are electrically fixedly connected to one another by means of multiple electrical cell connectors.

The publication DE 10 2016 124 501 A1 discloses a battery management system for a configurable rechargeable battery pack.

In the prior art, increasingly higher demands are placed on the performance of such systems, in other words increasingly higher current strengths are to be transmitted at least at the same voltage. At the same time, the space requirement should not increase significantly, in other words the design of existing battery cabinets/rechargeable battery racks should not change if possible. In particular, the need arises to avoid using patch cables that have too low a current-carrying capacity for future, more powerful systems.

The German Patent and Trade Mark Office has searched the following prior art in the priority application relating to the present application: DE 10 2015 105 482 B4, DE 196 24 662 A1, DE 10 2011 089 978 A1, US 2018/0358789 A1 and EP 2 176 901 B1.

SUMMARY

An object of the disclosure is to provide a high-current plug-in connector that has an intuitive and downwardly compatible coding for identifying its current-carrying capacity. In particular, the downwardly compatible coding is intended to avoid mating with mating plug-in connectors of higher current-carrying capacity and to enable mating with mating plug-in connectors of equal or lower current-carrying capacity.

The object is achieved by way of the respective subject matter of the independent claims.

A high-current plug-in connector comprises a plug-in connector housing and a socket contact that is arranged therein. The socket contact has a plug-in area having a contact bore. The high-current plug-in connector has a coding for identifying its maximum current-carrying capacity.

The socket contact has one or more grooves at the contact bore and each groove has a contact spring that is arranged therein or at least engages therein.

The number of contact springs determines the current-carrying capacity of the high-current plug-in connector. The coding is formed by the depth of the contact bore.

A plug-in connector system comprises a first high-current plug-in connector. This has two grooves and two contact springs. Furthermore, the system has a second high-current plug-in connector that has only one groove and only one contact spring. In addition, the system has a first mating plug-in connector which has a mating plug-in connector housing and a pin contact having a contact pin. The mating plug-in connector housing has a locking device and a plug-in portion into which the contact pin protrudes.

The first high-current plug-in connector has a higher current-carrying capacity than the second high-current plug-in connector. The contact bore of the first high-current plug-in connector is deeper than that of the second high-current plug-in connector.

The first high-current plug-in connector can be mated and locked with the first mating plug-in connector. However, the second high-current plug-in connector cannot fully mate with the first mating plug-in connector due to the shallower depth of its contact bore and thus cannot be locked.

In particular, the current-carrying capacity of the first high-current plug-in connector can correspond to the current-carrying capacity of the first mating plug-in connector. In other words, the current-carrying capacity of the first high-current plug-in connector can be at least as great as the current-carrying capacity of the first mating plug-in connector.

In this case and in the following, the term "current-carrying capacity" denotes the maximum permissible current strength that can be transmitted via the high-current plug-in connector or the mating plug-in connector.

The plug-in area of the socket contact of the high-current plug-in connector can comprise a substantially hollow cylindrical basic shape, wherein the cylindrical cavity of the hollow cylinder, which is referred to in technical jargon as well as here and in the following as "contact bore", has the same inner diameter for all high-current plug-in connectors of the plug-in connector system.

Advantageous embodiments are disclosed in the subordinate claims and the following description.

A particular advantage is that the high-current plug-in connector is capable of transmitting current strengths of more than 200 A ("amperes"), in particular more than 250 A, preferably more than 300 A, particularly preferably more than 350 A, thus for example even 400 and ideally even more, in particular at voltages of more than 1000 V ("volts"), for example at 1500 V.

A particular advantage is furthermore that the high-current plug-in connector is downwardly compatible with respect to existing battery/rechargeable battery systems, in other words it can mate with systems that are designed for lower current strengths, for example only up to 200 A.

A further advantage is that the high-current plug-in connector can only be latched and/or locked by way of its socket contact with mating plug-in connectors in the plugged-in state if the mating plug-in connector is designed for the same or for lower current strengths than the said high-current plug-in connector. For this purpose, the mating plug-in connector can have a locking device, in particular a locking lever having a locking portion, which only engages with a latching element, in particular a latching bar of the plug-in connector housing, when the contact pin of the mating plug-in connector is inserted sufficiently deeply into the contact bore of the high-current plug-in connector. In another variant, the plug-in connector housing of the high-current plug-in connector can also comprise a locking device and the mating plug-in connector housing can have a mating latching element.

Conversely, the plug contacts and their arrangement in the respective plug-in connector housing/mating plug-in connector housing prevent high-current plug-in connectors from being mated and locked/latched with mating plug-in connectors if the high-current plug-in connectors are designed for only lower current strengths than the mating plug-in connectors.

In particular, this is achieved by the maximum insertion depth of high-current plug-in connectors that have a higher current-carrying capacity being greater than that of the high-current plug-in connectors that have a lower current-carrying capacity. This represents a particularly advantageous and intuitive coding.

At the same time, the increased insertion depth of the high-current plug-in connectors that are designed for higher current strengths also makes it possible to enlarge the contact area, in other words to create a larger contact surface over which higher current strengths can thus also be transmitted. For this purpose, multiple contact springs in the form of inner circumferential helical springs are each arranged in engagement with a circumferential groove in the inner contact surface of the contact socket of the high-current plug-in connector.

Generally speaking, high-current plug-in connectors that have a higher current-carrying capacity can have more contact springs than high-current plug-in connectors that have a lower current-carrying capacity. For example, a first high-current plug-in connector that is designed for higher current strengths than a second high-current plug-in connector can comprise two contact springs, while the second high-current plug-in connector comprises only one contact spring.

In particular, the current-carrying capacity of the first high-current plug-in connector is then twice as high as the current-carrying capacity of the second high-current plug-in connector.

It is thus of particular advantage that the high-current plug-in connectors that are designed for different current strengths, in other words for example the first high-current plug-in connector and the second high-current plug-in connector, differ in the depth of the contact bore of their contact sockets and in the number of their contact springs. Therefore, the same housings can be used for the first and second high-current plug-in connectors. Their socket contacts also differ only in the depth of their contact bore and the number of circumferential grooves that are arranged therein and in which the contact springs engage.

The contact springs can preferably be helical spring rings.

In a numerical example, a plug-in system in connection with the said coding can be explained as follows:

For example, a current of up to 200 A can be transmitted per contact spring.

Furthermore, the contact bores of those high-current plug-in connectors that are designed for higher current strengths have a greater depth than those high-current plug-in connectors that are designed for lower current strengths.

In addition, the socket contacts of those high-current plug-in connectors that are designed for higher current strengths have more contact springs than those high-current plug-in connectors whose current-carrying capacity is lower.

The more contact springs they have, the more current the socket contacts of the high-current plug-in connectors can transmit, for example up to 600 A with three contact springs, up to 400 A with two contact springs or 200 A with only one contact spring.

The deeper the contact bore of the respective plug-in area, the more contact springs can be arranged in it. At the same time, due to the depth of the respective contact bore, a downwardly compatible coding takes place with respect to one or more mating plug-in connectors.

The mating plug-in connectors are coded in particular in that the contact pins of the pin contacts protrude deeper into the plug-in area of their mating plug-in connector housing for higher current strengths to be transmitted than for lower current strengths. The high-current plug-in connectors that are to be mated with them are coded by the depth of the contact bore of their contact socket.

The respective mating plug-in connectors are suitable for the function of the rechargeable battery and/or battery management system to which they are attached, because this assignment is made during the installation of the rechargeable battery rack/rechargeable battery cabinet/switch cabinet or the like. High-current cables that are capable of carrying sufficient current are also connected to correspondingly powerful high-current plug-in connectors so as to produce the patch cables.

However, the main aim of the aforementioned coding is to avoid incorrect operation during application ("patching"). This is because the aim is to avoid that at least some patch cables that are not sufficiently powerful can be connected to the battery system by their high-current plug-in connectors in such a manner that they are loaded with excessively high current strengths. After all, this poses a significant risk when expanding battery systems into the range of higher current strengths, in particular because of the less powerful patch cables that already exist on the market.

In this context, the current strengths cannot only from the current carrying capacity of the mating plug-in connector, but in addition can also from the respective application and the structure of the battery system.

In particular, the current strengths which—phrased the other way round—a suitable patch cable should be able to handle are determined by how much current the entire rechargeable battery pack, its individual rechargeable batteries and/or the battery management system can supply and/or receive via the individual mating plug-in connectors attached to it, depending on the respective structure of the battery system.

Accordingly, the suitably coded (and thereby also capable of carrying sufficient current itself) mating plug-in connector can be selected and attached during construction, whereby the high-current plug-in connectors that can be mated therewith and the patch cables equipped with it are determined by means of the aforementioned coding.

Alternatively or in addition, it is also conceivable to design a mating plug-in connector to be modifiable with respect to its coding. Such a modifiable mating plug-in connector could, for example, be mountable and/or adjustable in such a manner that its contact pin protrudes sufficiently deep into its plug-in area according to the desired current strength. For this purpose, for example, two different installation positions for the pin contact could be provided in the mating plug-in connector housing by way of its inner contour. Alternatively, a mechanism, for example a screw mechanism, could be provided by way of which this depth of said protrusion of the contact pin into the plug-in area can be adjusted.

The mating plug-in connector(s) preferably has/have a mounting housing and is/are intended as built-in plugs for connection and attachment to the rechargeable batteries in question. The rechargeable batteries therefore "determine" the required and supplied current strengths in the battery system. Advantageously, the rechargeable batteries and/or the battery management system can encode these requirements via the mating plug-in connectors attached to them, so that only high-current plug-in connectors of patch cables that are capable of carrying sufficient current can be mated and locked with the respective mating plug-in connectors of the battery system, in particular of the rechargeable batteries and/or the battery management system.

BRIEF DESCRIPTION OF THE DRAWINGS

An exemplary embodiment of the invention is illustrated in the drawings and will be explained in more detail in the following.

DETAILED DESCRIPTION

The figures contain partially simplified, schematic representations. In part, identical reference signs are used for similar but possibly not identical elements. Different views of the same elements could be scaled differently.

Figure 1:
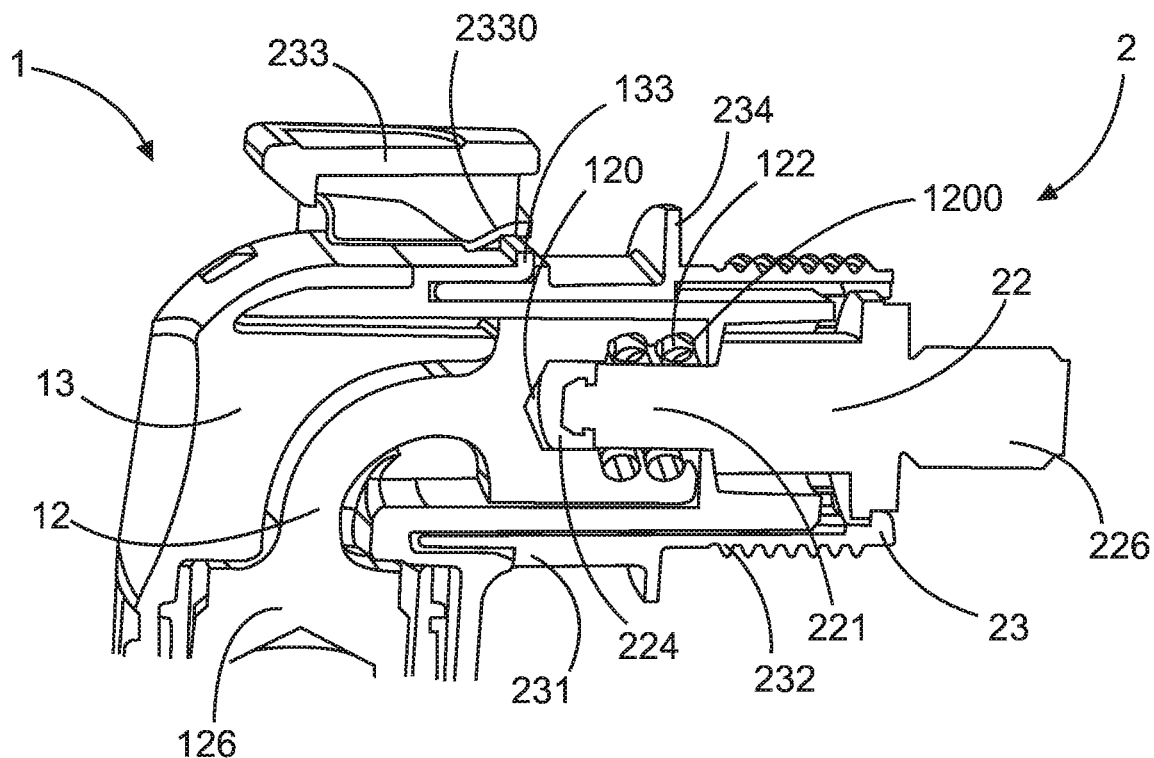
FIG. 1 shows a first high-current plug-in connector with a mating plug-in connector in the mated and locked state.

FIG. 1 shows a first high-current plug-in connector 1 having an angled socket contact 12 that is arranged in an angled plug-in connector housing 13. The socket contact 12 has a plug-in area 121 and a cable connection area 126, wherein the plug-in area 121 is designed as a contact socket and has a substantially hollow cylindrical shape, in other words has a substantially cylindrical cavity 120, namely a so-called "contact bore".

Two circumferential grooves 1200 are arranged, for example milled, on the cylindrical cavity 120.

An annular helical spring engages in each of these grooves 1200 as a contact spring 122. In the non-plugged state, the contact springs protrude into the cylindrical cavity. In the illustrated plugged-in state, each of these contact springs 122 makes contact in an electrically highly conductive manner with a contact pin 221 of a pin contact 22 of an inserted mating plug-in connector 2. Each of the contact springs 122 can transmit current strengths of, for example, up to 200 A, so that the entire contact arrangement 12, 22 in this numerical example can transmit an electrical current of up to 400 A. In this numerical example, the mating plug-in connector 2 is also designed so as to supply or receive current strengths of up to 400 A.

Furthermore, the mating plug-in connector 2 has a mating plug-in connector housing 23 having a locking device. The locking device comprises a locking lever 233 having a locking portion 2330 which engages in a locking manner behind a locking bar 133 of the plug-in connector housing 13. Furthermore, the mating plug-in connector housing 23 has on the cable connection side a contact receptacle 232 that is illustrated on the right in the drawing, as well as a mounting flange 234 adjoining it and, on the plug-in side (on the left in the drawing) of the mounting flange 234, a plug-in portion 231 into which the contact pin 221 of the pin contact 22 protrudes.

The first high-current plug-in connector 1 is locked to the mating plug-in connector 2 by the locking lever 233 of the mating plug-in connector 2, because the locking lever 233 engages with its locking portion 2330 behind a locking bar 133 of the plug-in connector housing 13.

Figure 2:
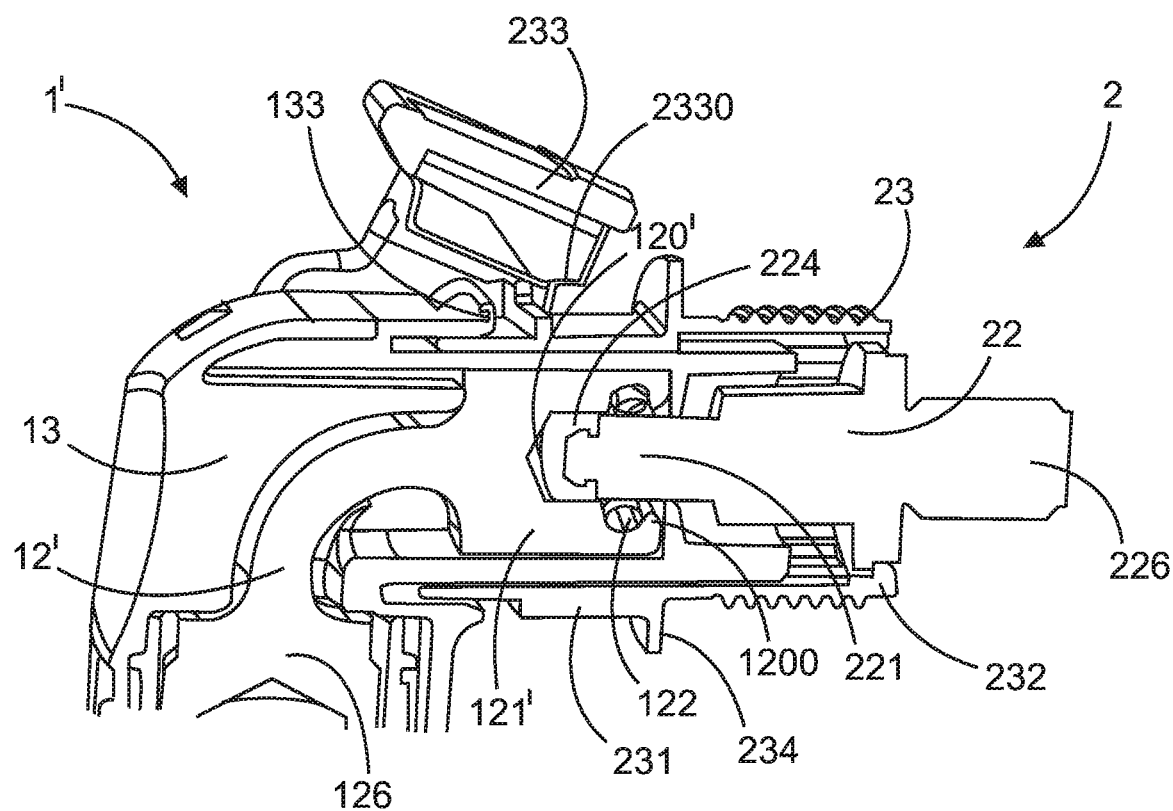
FIG. 2 shows a second high-current plug-in connector with the mating plug-in connector in the only partially mated and unlockable state.
Figure 3:
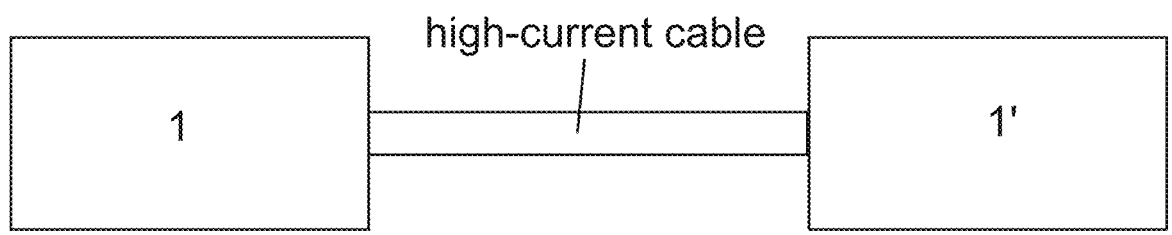
FIG. 3 shows a patch cable for a rechargeable battery pack with a high-current cable and two high-current plug-in connectors.

FIG. 2 shows an arrangement which differs therefrom in that in lieu of the first high-current plug-in connector 1, a second high-current plug-in connector 1' is only partially mated with the mating plug-in connector 2 and is therefore not locked and is also not lockable to the latter 2.

The second high-current plug-in connector 1' differs from the first high-current plug-in connector 1 in its second socket contact 12', the cylindrical cavity 120' of which has only one groove 1200 having a contact spring 122 that is arranged therein, so that the second high-current plug-in connector 1' can only transmit up to 200 A in the numerical example. Furthermore, its cavity 120' has the same diameter but a smaller depth than the cavity 120 of the first socket contact 12 of the first high-current plug-in connector 1. As a result, the second high-current plug-in connector 1' is effectively coded against mating incorrectly with the mating plug-in connector 2 which has a higher current-carrying capacity than said second high-current plug-in connector.

Only one groove 1200 having a contact spring 122 arranged therein is arranged on the cavity 120' of the second plug contact 1, so that the second high-current plug-in connector 1' can only transmit up to 200 A in the aforementioned numerical example.

The plug-in area of the pin contact 22, which is designed as a contact pin 221, of the mating plug-in connector 2, can therefore not penetrate as deeply into the cavity 120' of the second high-current plug-in connector 1' as is the case with the first high-current plug-in connector 1 from the previous illustration (shown in FIG. 1). Instead, the mating plug-in connector 2 having its contact guard 224 that is attached to the plug-in area 221 already strikes the end of the cavity 120' of the second high-current plug-in connector 1' before the locking lever 233 can engage over the locking bar 133 with its locking portion 2330.

This also means that the two housings 13, 23 cannot be mated and locked together as deeply as was the case in the previous FIG. 1. As a result, the locking lever 233 of the mating plug-in connector 2 cannot be closed on the plug-in connector housing 13 of the second high-current plug-in connector 1', which intuitively signals to a user during manual use that the second high-current plug-in connector 1' does not match the mating plug-in connector 2.

In a second embodiment not illustrated in the drawing, a second mating plug-in connector in the mentioned numerical example can be designed only for, in other words up to, current strengths of only 200 A. Its contact pin 221 then protrudes on the plug-in side less into the plug-in portion 231 of the second mating plug-in connector housing 23. This can be achieved by arranging the pin contact 22 further in the direction of its cable connection area 226, in other words further to the right in the drawing, in the mating plug-in connector housing 23. Then both the second high-current plug-in connector 1' and the first high-current plug-in connector 1 are mateable and lockable therewith, providing a useful downward compatibility, as explained in the following.

In the mentioned numerical example, a patch cable that is designed for 400 A has two first high-current plug-in connectors, which are also designed for 400 A.

A second patch cable that is designed for only 200 A has two second high-current plug-in connectors 1' that are also designed for only 200 A.

A rechargeable battery pack that has multiple rechargeable batteries ("accumulators") which are capable of delivering current strengths of up to 400 A in total is equipped with mating plug-in connectors 2 that are also designed for these current strengths of 400 A.

The patch cable which is designed for 400 A can be mated and locked with these mating plug-in connectors 2.

The second patch cable which is only designed for 200 A—in contrast thereto—cannot be correctly mated and locked with these mating plug-in connectors 2 and intuitively signals this to the user.

Conversely, the patch cable, which is designed for 400 A, would be perfectly usable on a second battery pack, which is only designed for 200 A and accordingly equipped with second mating plug-in connectors, because where appropriate their contact pin 221 simply engages less deeply in the contact bore 120 of the first high-current plug-in connector 1.

During construction, it is the task of the expert design engineer to consider that within the rechargeable battery pack multiple rechargeable batteries can also be connected via the said patch cables, for example also parallel connected, and that this increases the maximum total current strength which can flow where appropriate via at least some of the patch cables. Accordingly, a suitable selection of the respectively installed mating plug-in connectors 2 with suitable coding must be made by said expert design engineer.

Thus, with minor changes in the construction between the first high-current plug-in connector 1 and the second high-current plug-in connector 1', a powerful and intuitive downwardly compatible coding of the rechargeable battery pack having the patch cables is ensured.

Even if various aspects or features of the invention are each shown in combination in the figures, it will be apparent to the person skilled in the art—unless otherwise indicated—that the combinations illustrated and discussed are not the only possible ones. In particular, corresponding units or feature complexes from different exemplary embodiments can be interchanged with one another.

LIST OF REFERENCE SIGNS

1 First high-current plug-in connector
1' Second high-current plug-in connector
12 First socket contact
12' Second socket contact
120 First cavity ("contact bore")
120' Second cavity ("second contact bore")
1200 Groove
121 First plug-in area (contact socket)
121' Second plug-in area (contact socket)
122 Contact spring
126 Cable connection area
13 Plug-in connector housing
133 Locking bar
2 Mating plug-in connector
22 Pin contact
221 Plug-in area (contact pin)
224 Contact guard
226 Cable connection
23 Mating plug-in connector housing
231 Plug-in portion
232 Contact receptacle
233 Locking lever
234 Mounting flange
2330 Locking portion

The invention claimed is:

1. A set comprising a first high-current plug-in connector (1) and a second high-current plug-in connector (1'), the first high-current plug-in connector (1) and the second high-current plug-in connector (1') each comprising:
   a plug-in connector housing (13); and
   a socket contact (12, 12') arranged in the plug-in connector housing (13), the socket contact (12, 12') having
      a plug-in area (121, 121') with a contact bore (120, 120'),
      a number of one or more grooves (1200) at the contact bore (120, 120'),
      a contact spring (122) arranged in or engaging in each of the one or more grooves (1200),
   wherein the first high-current plug-in connector (1) comprises more grooves then the second high-current plug-in connector (1'), and
   wherein the contact bore (120) of the first high-current plug-in connector (1) is deeper than the contact bore (120') of the second high-current plug-in connector (1'), and
   wherein the first high-current plug-in connector (1) has a greater current-carrying capacity than the second high-current plug-in connector (1').

2. The set as claimed in claim 1,
   wherein the contact springs (122) are annular helical springs.

3. A patch cable for a rechargeable battery pack, comprising:
   a high-current cable; and
   two high-current plug-in connectors (1, 1') selected from the set as claimed in claim 1 connected to the high-current cable,
   wherein a current-carrying capacity of the high-current cable corresponds at least to the current-carrying capacity of the two high-current plug-in connectors (1, 1') that are connected thereto.

4. A plug-in connector system, comprising:
   the first high-current plug-in connector (1) from the set as claimed in claim 1, the first high-current plug-in connector (1) having two grooves (1200) and two contact springs (122), and
   the second high-current plug-in connector (1') from the set as claimed in claim 1, the second high-current plug-in connector (1') having only one groove (1200) and only one contact spring (122); and
   a first mating plug-in connector (2) which has a mating plug-in connector housing (23) and a pin contact (22) having a contact pin (221),
   wherein the mating plug-in connector housing (23) has a locking device (233) and a plug-in portion (231) into which the contact pin (221) protrudes, wherein the first high-current plug-in connector (1) can be mated and locked with the first mating plug-in connector and wherein the second high-current plug-in connector (1') is not fully mateable with the first mating plug-in connector (2) due to a shallower depth of its contact bore (120') and thus cannot be locked.

5. The plug-in connector system as claimed in claim 4, wherein the current-carrying capacity of the first mating plug-in connector (2) corresponds to the current-carrying capacity of the first high-current plug-in connector (1).

6. The plug-in connector system as claimed in claim 4, further comprising a second mating plug-in connector having a second mating plug-in connector housing, wherein the contact pin (221) of the second mating plug-in connector protrudes less into the plug-in portion of the second mating plug-in connector housing than is the case with the first mating plug-in connector (2), wherein the second mating plug-in connector is mateable and lockable both with the second high-current plug-in connector (1') and also with the first high-current plug-in connector (1), wherein the contact pin (221) of the second mating plug-in connector in a state mated with the first high-current plug-in connector (1) fills only a part of the contact bore (120) of the first high-current plug-in connector (120).

7. The plug-in connector system as claimed in claim 6, wherein the current-carrying capacity of the second mating plug-in connector corresponds to the current-carrying capacity of the second high-current plug-in connector (1').

* * * * *